United States Patent
Karaoguz et al.

(10) Patent No.: US 7,483,985 B2
(45) Date of Patent: Jan. 27, 2009

(54) MEDIA SEARCH ENGINE FOR A PERSONAL MEDIA NETWORK

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 691 days.

(21) Appl. No.: 10/667,857

(22) Filed: Sep. 22, 2003

(65) Prior Publication Data

US 2004/0117848 A1 Jun. 17, 2004

Related U.S. Application Data

(60) Provisional application No. 60/448,658, filed on Feb. 18, 2003, provisional application No. 60/443,894, filed on Jan. 30, 2003, provisional application No. 60/432,472, filed on Dec. 11, 2002.

(51) Int. Cl.
*G06F 15/173* (2006.01)

(52) U.S. Cl. .................. 709/226; 709/212; 709/217; 709/219; 709/223; 709/230; 725/86; 725/91; 725/100; 725/103; 348/207.1

(58) Field of Classification Search .................. 709/212, 709/217, 219, 223, 226, 230; 725/86, 91, 725/98, 100, 103, 9; 348/207.1
See application file for complete search history.

(56) References Cited

U.S. PATENT DOCUMENTS

| | | | |
|---|---|---|---|
| 5,721,815 A * | 2/1998 | Ottesen et al. | 715/721 |
| 5,721,878 A * | 2/1998 | Ottesen et al. | 725/87 |
| 5,930,493 A * | 7/1999 | Ottesen et al. | 725/92 |
| 6,349,324 B1 * | 2/2002 | Tokoro | 709/200 |
| 6,480,889 B1 * | 11/2002 | Saito et al. | 709/220 |
| 6,631,247 B1 * | 10/2003 | Motoyama et al. | 399/8 |
| 6,693,896 B1 * | 2/2004 | Utsumi et al. | 370/352 |
| 6,963,358 B2 * | 11/2005 | Cohen et al. | 348/207.1 |
| 7,055,104 B1 * | 5/2006 | Billmaier et al. | 715/765 |
| 7,065,778 B1 * | 6/2006 | Lu | 725/98 |
| 7,075,573 B2 * | 7/2006 | Imaeda | 348/231.99 |
| 7,080,400 B1 * | 7/2006 | Navar | 725/139 |
| 7,234,117 B2 * | 6/2007 | Zaner et al. | 715/758 |
| 2003/0004916 A1 * | 1/2003 | Lewis | 707/1 |
| 2003/0043272 A1 * | 3/2003 | Nagao et al. | 348/207.1 |
| 2003/0078968 A1 * | 4/2003 | Needham et al. | 709/204 |
| 2004/0243671 A9 * | 12/2004 | Needham et al. | 709/204 |
| 2007/0174886 A1 * | 7/2007 | Scheuer et al. | 725/110 |
| 2007/0198738 A1 * | 8/2007 | Angiolillo et al. | 709/231 |

* cited by examiner

*Primary Examiner*—Liangche A Wang
(74) *Attorney, Agent, or Firm*—McAndrews, Held & Malloy, Ltd.

(57) ABSTRACT

A system providing search functionality supporting the exchange and consumption of media is disclosed. The searching of media on storage belonging to any of a pre-defined group of users of a personal media network is provided. In addition, media stored on designated servers may also be included in a search. The media stored may include audio, still images, video, and data. A user may search the stored media using a number of criteria including the time period of the media, the type of device, and the type of media. The system also provides support for the search of one or more media peripherals, which may be searched when the media peripherals are communicatively coupled to the system.

32 Claims, 12 Drawing Sheets

| CHANNEL LINE UP | HOUR, DAY | | | | |
|---|---|---|---|---|---|
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | Showing All Day (48 Min), Earliest Order Time: 4:00PM MPEG-2 1.5 Mbps | | |
| VACATION in ALASKA VIDEO 803 | Express Estimated Delivery Time: 18 min Cost: $1.2 (with Queuing) | | Showing All Day (48 Min), Earliest Order Time: 4:00PM MPEG-2 4 Mbps | | |
| VACATION in ALASKA VIDEO 804 | Overnight Delivery: Avail. Nxt Morning Cost: 5c (Server Stored) | | Showing All Day (48 Min), Earliest Order Time: 4:00PM MPEG-2 19 Mbps | | |

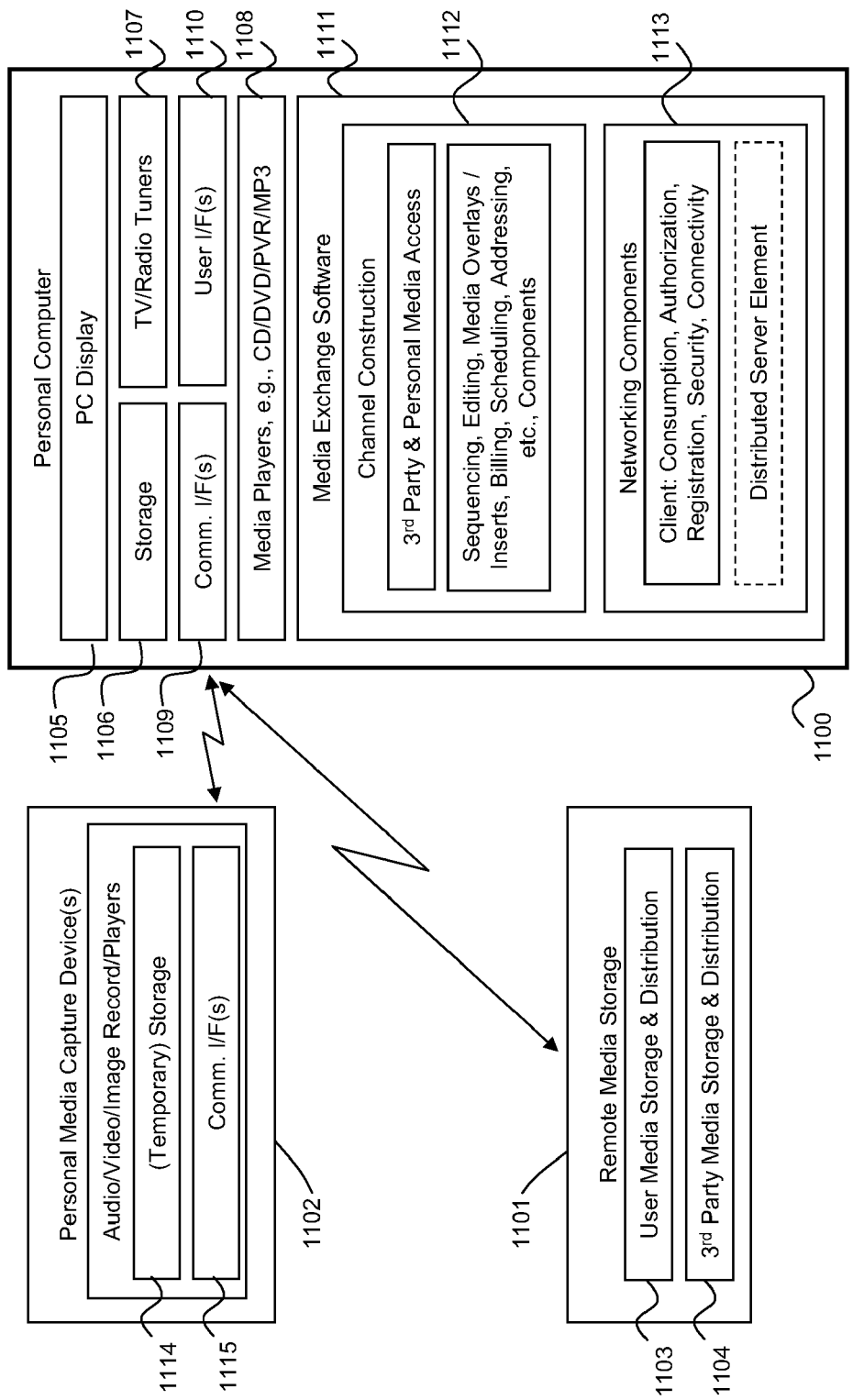

MEDIA SEARCH ENGINE FOR A PERSONAL MEDIA NETWORK

CROSS-REFERENCE TO RELATED APPLICATIONS/INCORPORATION BY REFERENCE

This application makes reference to, claims priority to, and claims the benefit of U.S. Provisional Patent Application 60/448,658, entitled "Media Search Engine For A Personal Media Network" filed Feb. 18, 2003, U.S. Provisional Application Ser. No. 60/432,472, entitled "Personal Inter-Home Media Exchange Network" filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety. In addition this application makes reference to U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network" filed Sep. 11, 2003, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A personal computer (PC) employing a web browser is often used to search for media, data, and services distributed over various web sites on the Internet. Often, a user is not aware of web sites that are available on the Internet and the type of media, data, and services they might provide. A user typically needs to use a search engine service to look for web sites in order to find media, data, and services that are available on the Internet and that the user is interested in. The user is limited to that media, data, and services on the Internet.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system providing search functionality to support the exchange and consumption of media. An embodiment of the present invention may comprise a first television display in a first home, and a first storage in the first home that stores the media. The first storage may support consumption of the media by the first television display. An embodiment of the present invention may also comprise a second television display in a second home, and a second storage supporting consumption of the media by the second television display in the second home. The first storage may have an associated first network protocol address, and the second storage may have an associated second network protocol address.

An embodiment in accordance with the present invention may comprise a communication network and search software. The search software may receive a request comprising user defined search criteria and one of the first and second associated network protocol addresses. The first and second associated network protocol addresses may represent members of a pre-defined group of users. The search software may respond by identifying media stored on at least one of the first and second storage, where the identified media may match the user defined search criteria. The media may comprise at least one of audio, a still image, video, and data, and the first and second network protocol addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet.

In an embodiment of the present invention, the consumption may comprise at least one of playing digitized audio, displaying a still image, displaying video, and displaying data. The user defined search criteria may comprise at least one of a time period, a device type, a specific media, a media type, a specific media channel, and a media channel type. An embodiment in accordance with the present invention may comprise at least one media peripheral communicatively coupled to the first storage, and the at least one media peripheral may have storage. The search software may respond by identifying media stored on the at least one media peripheral, and the identified media may match the user defined search criteria. The at east one media peripheral may comprise at least one of a digital camera, a digital camcorder, a television, a personal computer, a CD player, a home juke-box, a multimedia gateway device, a multi-media personal digital assistant, a DVD player, a tape player, and a MP3 player.

An embodiment of the present invention may comprise at least one server for storing media, where the at least one server may have been designated by a user for searching. The search software may respond by identifying media stored on the at least one server, and the identified media may match the user defined search criteria. The at least one server may comprise at least one of a 3rd party media provider, a media peripheral, a personal computer, a 3rd party storage vendor, and a broadband head end.

Further aspects of the present invention me be seen in a system providing search functionality to support the exchange and consumption of media. Such a system may comprise a first storage for storing media, in a first home, and a second storage for storing media, in a second home. The first storage may have a first associated protocol address, and the second storage may have a second associated protocol address. An embodiment of the present invention may also comprise set top box circuitry, in the first home, communicatively coupled to support searching of storage at the first and second associated protocol addresses. An embodiment of the present invention may comprise a communication network communicatively coupling the set top box circuitry and the second storage. Such an embodiment may also have search software that receives a request comprising user defined search criteria and one of the first and second associated protocol addresses. The first and second associated protocol addresses may represent members of a pre-defined group of users, and the search software may respond by identifying the other of the first and second associated protocol addresses. The search software may also identify the media available at the first and second associated protocol addresses, and the identified media may match the user defined search criteria.

The media in an embodiment of the present invention may comprise at least one of audio, a still image, video, and data. The first and second protocol addresses may be one of an Internet protocol (IP) address, a media access control (MAC) address, and an electronic serial number (ESN). In addition, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network in an embodiment of the present invention may be the Internet.

The consumption in an embodiment of the present invention may comprise at least one of playing digitized audio, displaying a still image, displaying video, and displaying data, and the user defined search criteria may comprise at least one of a time period, a device type, a specific media, a media type, a specific media channel, and a media channel type. An embodiment of the present invention may also comprise at least one media peripheral communicatively coupled to the first storage, and the at least one media peripheral may have storage. The search software may respond by identifying media stored on the at least one media peripheral, and the identified media may match the user defined search criteria. The at least one media peripheral may comprise at least one of a digital camera, a digital camcorder, a television, a personal computer, a CD player, a home juke-box, a multi-media gateway device, a multi-media personal digital assistant, a DVD player, a tape player, and a MP3 player. An embodiment in accordance with the present invention may comprise at least one server for storing media, and the at least one server may have been designated by a user for searching. The search software may respond by identifying media stored on the at least one server, and the identified media may match the user defined search criteria. The at least one server may comprise at least one of a 3rd party media provider, a media peripheral, a personal computer, a 3rd party storage vendor, and a broadband head end, in an embodiment of the present invention.

Yet other aspects of the present invention may be observed in a system providing search functionality to support the exchange and consumption of media. An embodiment in accordance with the present invention may comprise a first storage for storing media at a first home of a first user, and a second storage for storing media at a second home of a second user. The first and second users may be part of a pre-defined group of users. An embodiment of the present invention may comprise set top box circuitry in at least one of the first and second homes, and the set top box circuitry may be communicatively coupled to support the identification of media available to the pre-defined group of users. In addition, an embodiment of the present invention may comprise search software that receives user defined search criteria and that responds by identifying media available within the pre-defined group of users. The identified media may match the user defined search criteria, and the media may comprise at least one of audio, a still image, video, and data. The user defined search criteria in an embodiment of the present invention may comprise at least one of a time period, a device type, a specific media, a media type, a specific media channel, and a media channel type. An embodiment of the present invention may comprise at least one media peripheral communicatively coupled to the first storage, and the at least one media peripheral may have storage. The search software may respond by identifying media stored on the at least one media peripheral, and the identified media may match the user defined search criteria. The at least one media peripheral may comprise at least one of a digital camera, a digital camcorder, a television, a personal computer, a CD player, a home juke-box, a multimedia gateway device, a multi-media personal digital assistant, a DVD player, a tape player, and a MP3 player.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

FIG. 11 is a schematic block diagram of a PC interfacing to personal media capture devices and remote media storage on a media exchange network in accordance with an embodiment of the present invention.

DETAILED DESCRIPTION OF THE INVENTION

Certain embodiments of the present invention relate to searching for media, data, and services on a network. In particular, certain embodiments of the present invention relate to searching for media, data, and services on a personal media network using a search engine in a media exchange software platform.

Figure 1:
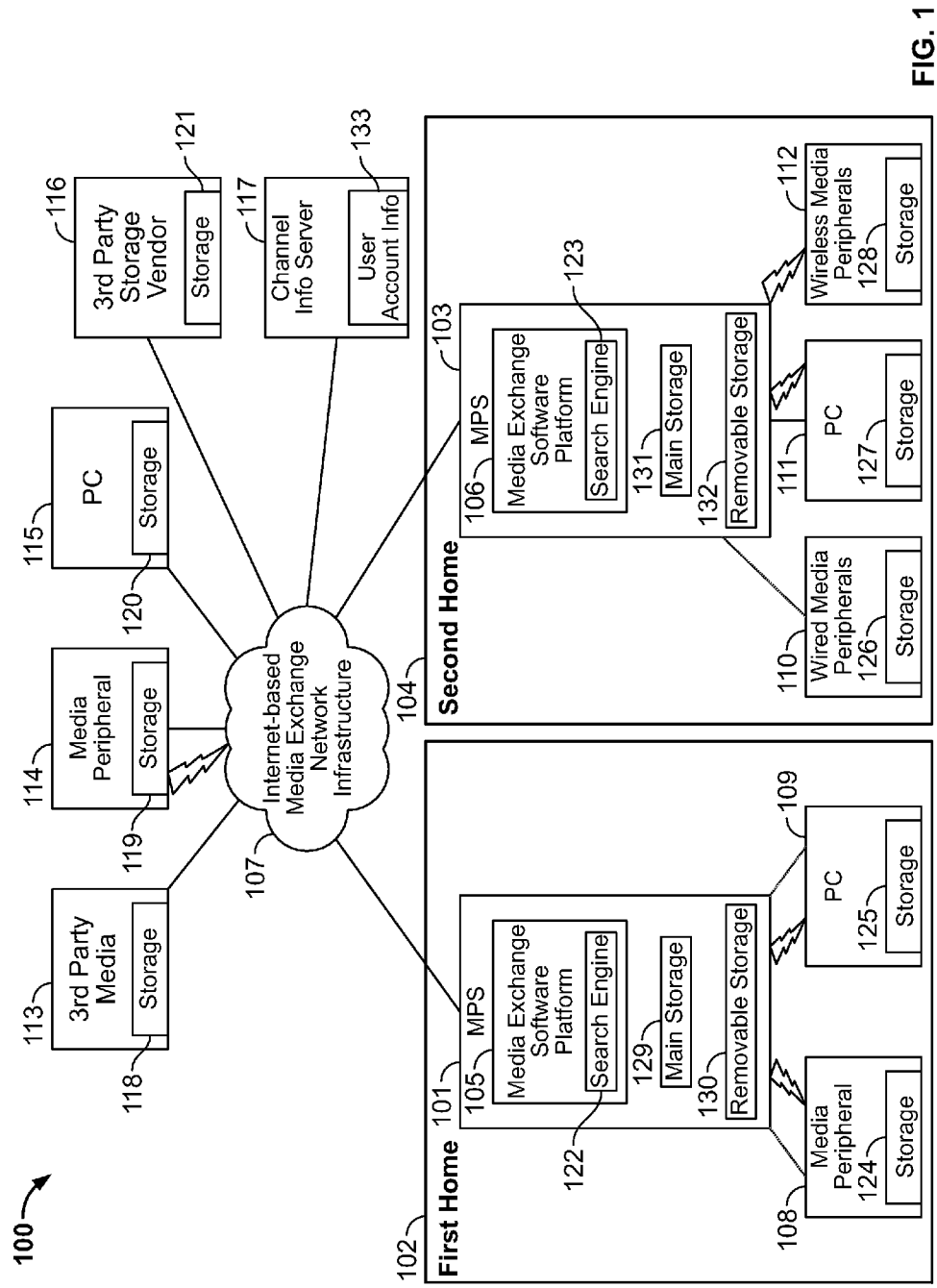
FIG. 1 is a diagram illustrating an embodiment of a personal media network supporting searching of media, data, and services, in accordance with various aspects of the present invention.

FIG. 1 is a diagram illustrating an embodiment of a personal media network 100 supporting searching of media, data, and services, in accordance with various aspects of the present invention. Specifically, a personal media network 100 is a communication network comprising a first MPS (media processing system) 101 located in a first home 102 of the media exchange network 100, a second MPS 103 located at a second home 104, and the Internet-based media exchange network infrastructure 107. The first MPS 101 and the second MPS 103 both interface to the Internet-based media exchange network infrastructure 107.

The personal media network 100 also comprises a media peripheral 108 and a PC 109 both interfacing, via a wired or wireless connection, to the MPS 101. The personal media network 100 further comprises wired media peripherals 110 interfacing to MPS 103 via wired connections, a PC 111 interfacing to MPS 103 via a wired or wireless connection, and wireless media peripherals 112 interfacing to MPS 103 via wireless connections.

The personal media network 100 also comprises several other systems interfacing to the Internet-based media exchange network infrastructure 107 including a 3rd party media provider 113, a media peripheral 114, a PC 115, a 3rd party storage vendor 116, and a channel info server 117.

The various components of the personal media network 100 include storage locations for digital media and data. The 3rd party media provider 113 includes a storage location 118. The media peripheral 114 includes a storage location 119. The PC 115 includes a storage location 120. The 3rd party storage vendor 116 includes a storage location 121. The media peripheral 108 includes a storage location 124. The PC 109 includes a storage location 125. The wired media peripherals 110 include a storage location 126. The PC 111 includes a storage location 127. The wireless media peripherals 112 include a storage location 128.

The first MPS 101 comprises a main storage location 129 and a removable storage location 130. Also, the second MPS 103 comprises a main storage location 131 and a removable storage location 132. The channel info server 117 stores user account information 133. The main storage locations may comprise, for example, hard disk drives, a DVD player, a CD player, floppy disk drives, RAM, or any combination of these. The removable storage locations may include, for example, memory sticks, PCM/CIA cards, compact flash cards, or any combination of these.

The PC's may comprise desktop PC's, notebook PC's, PDA's, or any computing device.

The various media peripherals (108, 110, 112, 114) of the personal media network 100 may include, for example, a digital camera, a digital camcorder, a television, a personal computer, a CD player, a MP3 player, a home juke-box system, a multi-media PDA (personal digital assistant), and a multi-media gateway device, a DVD player, a tape player, and various home appliances. The MPS's (101, 103) may include a TV screen for viewing a user interface and media content that are available on the personal media network 100.

The Internet-based media exchange network infrastructure 107 may comprise, for example, cable infrastructure, satellite network infrastructure, DSL infrastructure, Internet infrastructure, and/or intranet infrastructure providing wide area network (WAN) capability. Each of the entities within the media exchange network infrastructure 107 such as, for example, servers, media processing systems, media peripheral, etc., may be identified using a network protocol address such as, for example, an Internet protocol (IP) address, a media access control (MAC) address, an electronic serial number (ESN), etc.

The MPS 101 at the first home 102 further comprises a MES (media exchange software) platform 105 providing various media exchange functions. The MES platform 105 comprises a search engine 122 that may be used to search for media, data, and services stored on the personal media network 100. Similarly, the MPS 103 at the second home 104 further comprises a MES (media exchange software) platform 106 providing various media exchange functions. The MES platform 106 comprises a search engine 123 that may be used to search for media, data, and services stored on the personal media network 100.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

Figure 2:
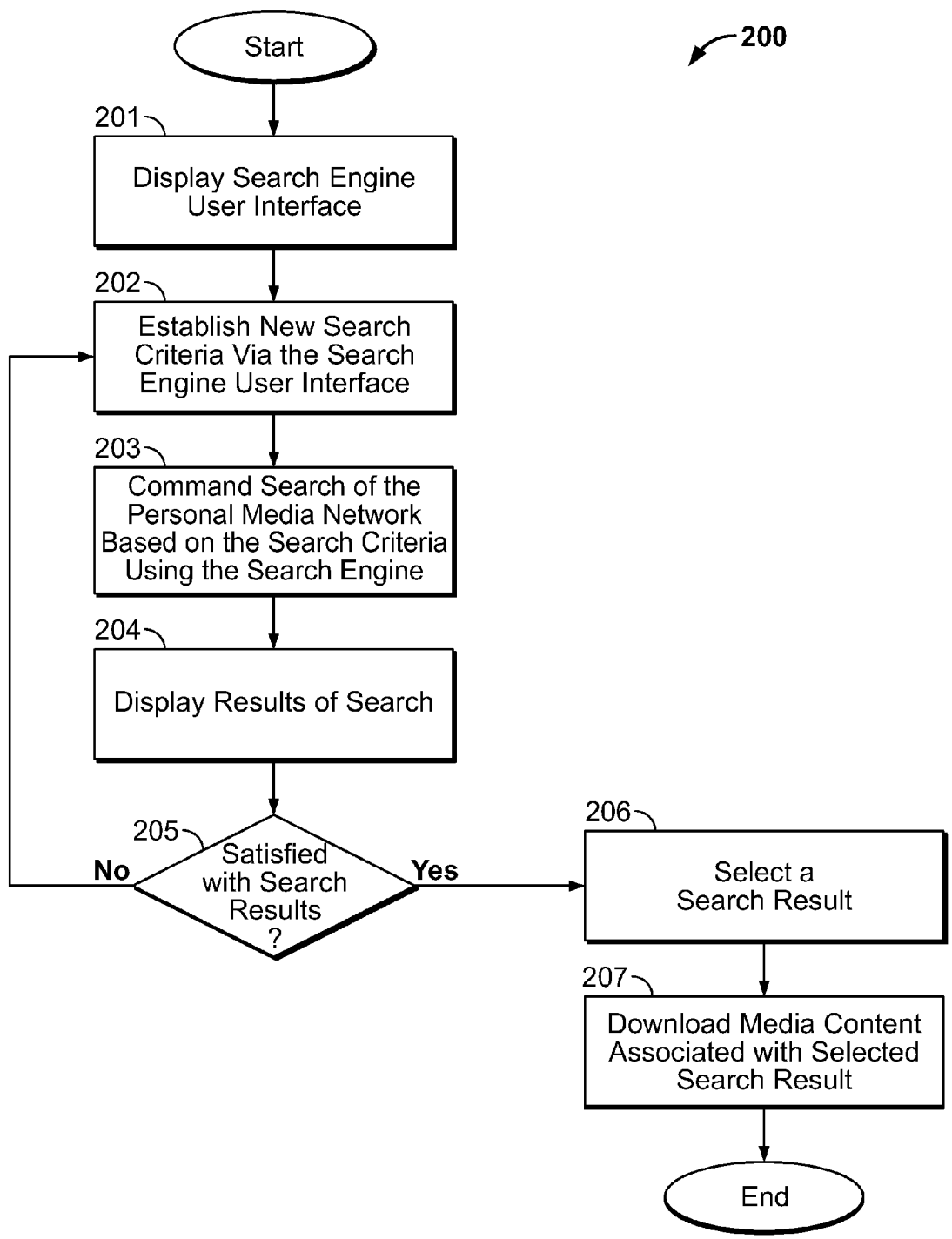
FIG. 2 is a flowchart illustrating an embodiment of a method to search for media, data, and services on the personal media network of FIG. 1, in accordance with various aspects of the present invention.

FIG. 2 is a flowchart illustrating an embodiment of a method 200 to search for media, data, and services on the personal media network 100 of FIG. 1, in accordance with various aspects of the present invention. In step 201, a user interface for a search engine is displayed on a TV screen of a MPS. In step 202, new search criteria are established via the search engine user interface. In step 203, a command is given to perform a search of a personal media network based on the search criteria using the search engine. In step 204, the results of the search are displayed. In step 205, a decision is made as to whether or not the search results are satisfactory. If the search results are not satisfactory, then the method goes back to step 202 to establish new search criteria that may yield better search results. Otherwise, in step 206, a search result is selected. In step 207, media content associated with the selected search result is downloaded to the MPS.

In accordance with an embodiment of the present invention, searches may be made according to at least the following search criteria:
time periods
device types
specific media
media types
specific media channels
media channel types All of the various storage areas on the personal media network 100 may be searched unless such storage areas are specifically requested not to be searched or if search authorization has not been obtained. Authorization may be given a priori by a media device on the network, or authorization may be given at the time a request is made during a search.

Various media types and formats may be available on the personal media network 100 including personal media, media content stored in a channel format, 3rd party media content, or any other digital media type and format.

As an example, a user of the MPS 101 at the first home 102 may bring up a search engine user interface on a TV screen of the MPS 101 and establish search criteria comprising "digital pictures" and "other MPS users" and not "$3^{rd}$ party providers". As a result, the user of MPS 101 may obtain search results indicating digital pictures that are stored on MPS 103, wired media peripherals 110, PC 111, and wireless media peripherals 112 at the second home 104. The second home may be the home of the user's brother, for example. The user of MPS 101 may see that, on PC 111, the brother has digital pictures available from his most recent vacation. The user of the MPS 101 may select and download the digital pictures over the personal media network 100. The user of MPS 101 may also see that, in main storage area 131, the brother has digital pictures of his wife, but has not given authorization for anyone on the personal media network 100 to download them.

As another example, the user of MPS 103 at the second home 104 may bring up a search engine user interface on a TV screen of the MPS 103 and establish search criteria comprising "movies" and "$3^{rd}$ party media providers" and not "other MPS users". As a result, the user of the MPS 103 may obtain search results indicating movies that are available from the $3^{rd}$ party media provider 113 and from the $3^{rd}$ party storage vendor 116. The user of the MPS 103 may select a movie from the $3^{rd}$ party media provider 113 and download the movie to his main storage area 131. In accordance with an embodiment of the present invention, the user of the MPS 103 may have to first pay for the movie or may be billed. The user of MPS 103 may also see that certain movies are stored at the $3^{rd}$ party storage vendor 116 but are not authorized for downloading because they are movies that are being stored as backup copies by some other $3^{rd}$ party.

As an alternative embodiment of the present invention, a PC having a MES platform with a search engine may be used to perform a search of a personal media network.

In accordance with an embodiment of the present invention, searching may be done based on user authorization. For example, a user may choose to exclude certain $3^{rd}$ party media on the media exchange network, only allowing certain types of $3^{rd}$ party media to be searched.

In accordance with an embodiment of the present invention, if a media peripheral comes into proximity of a MPS while the MPS is performing a search, the MPS may detect the presence of the media peripheral and perform a search of the media peripheral as well if the search criteria allow for such a search.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
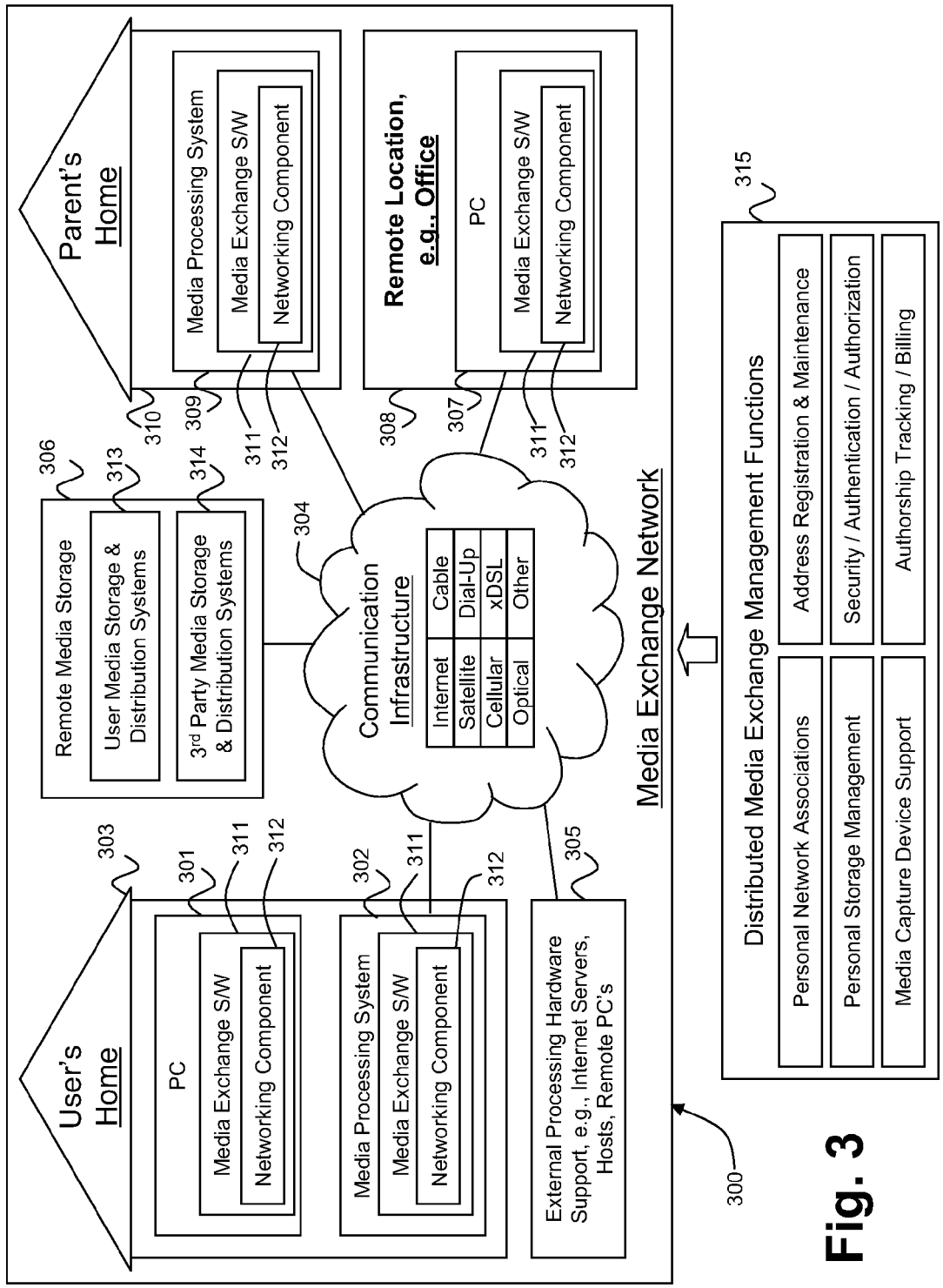
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
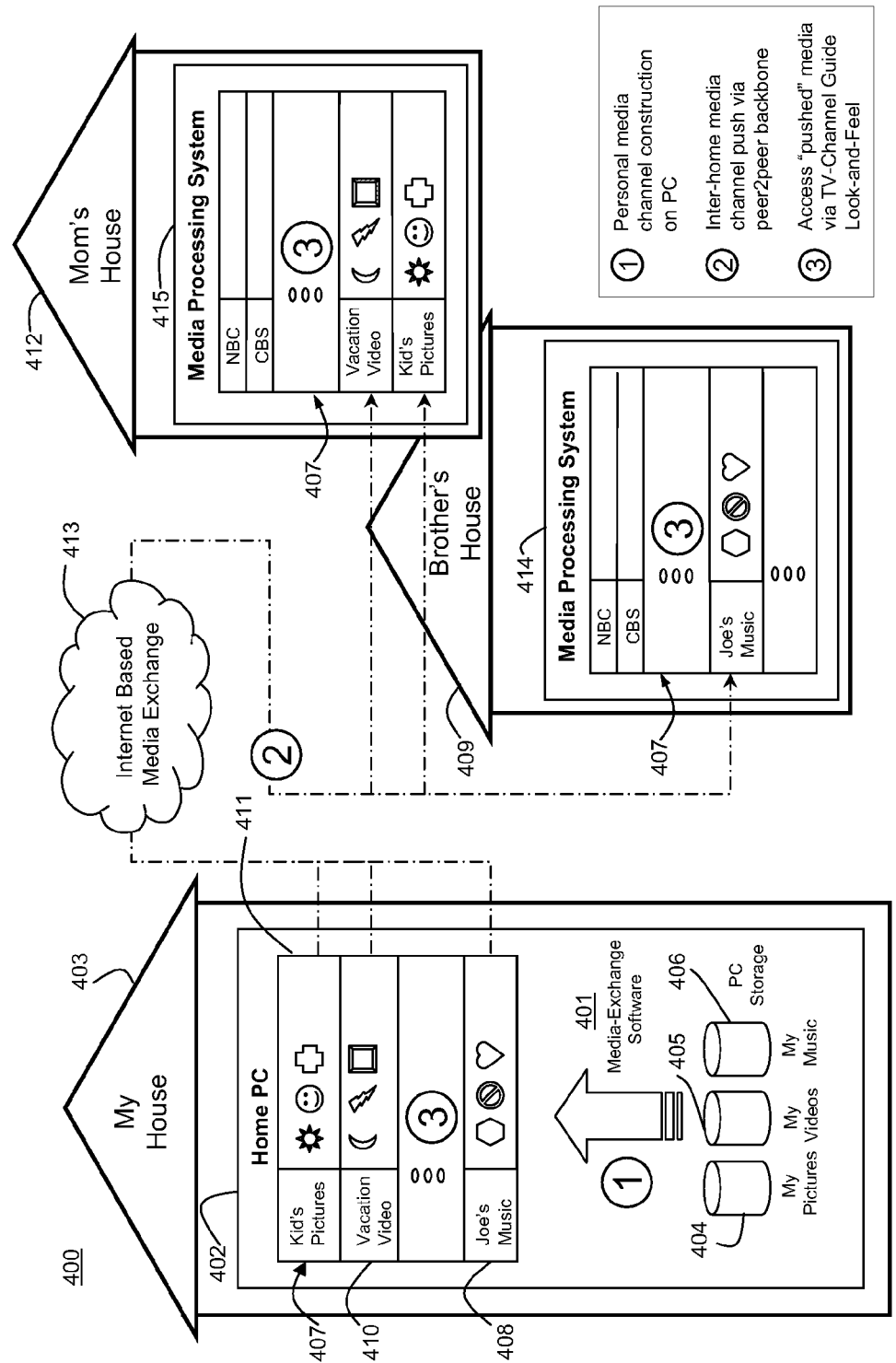
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
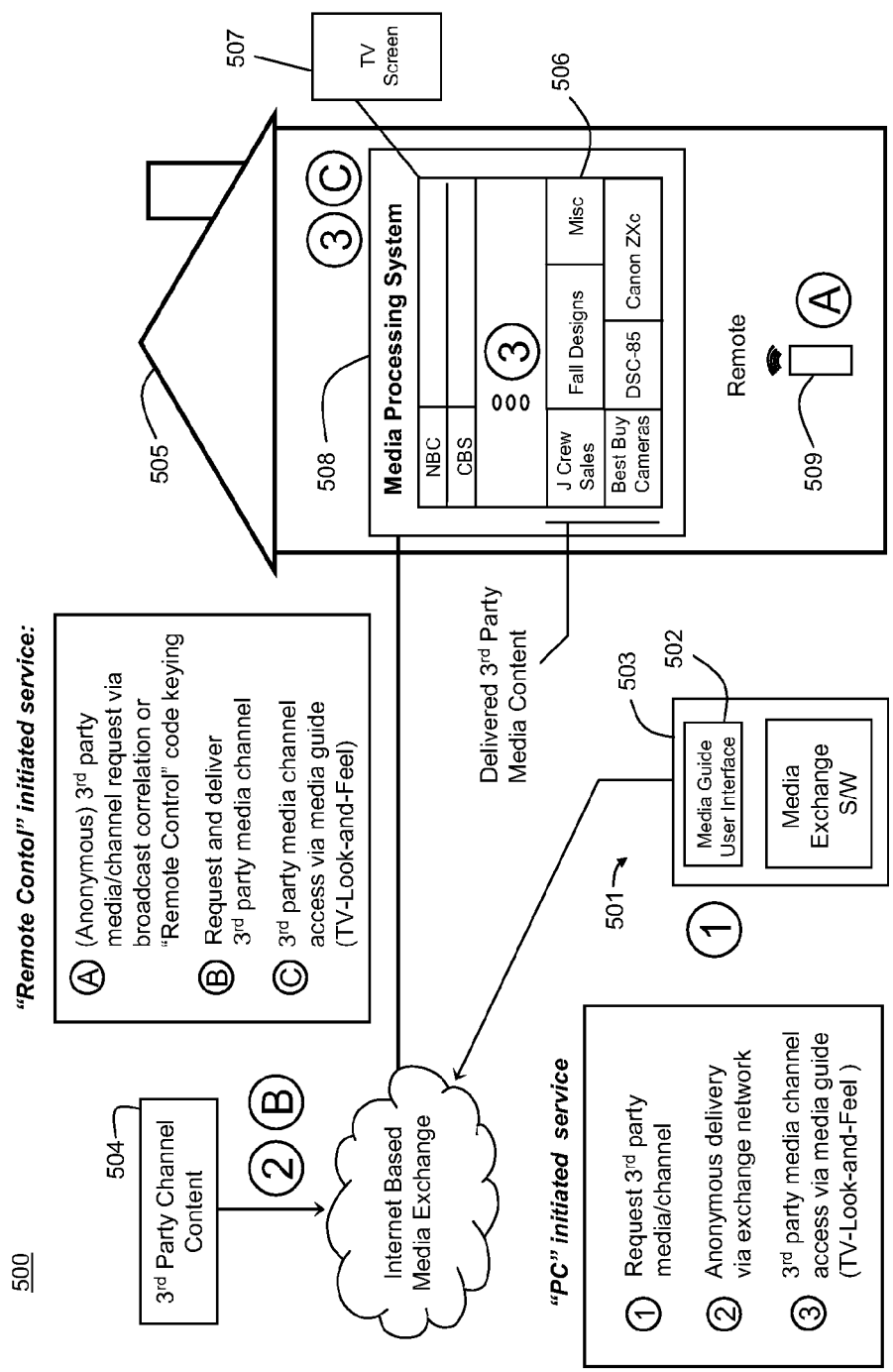
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
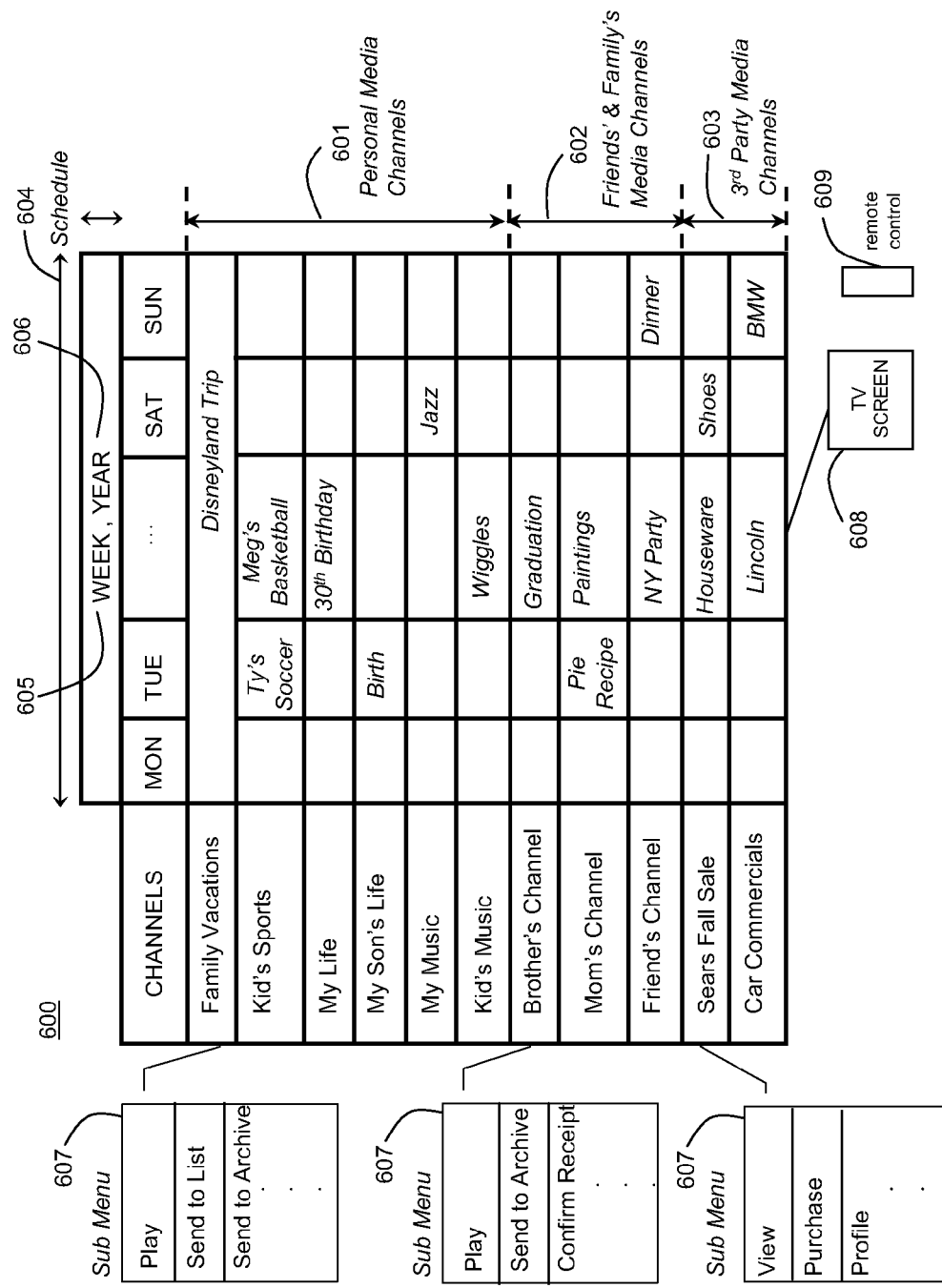
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a submenu 607 allows for selection of certain control and access functions such as "play", "send to list", "send to archive", "confirm receipt", "view", "purchase", and "profile".

Figure 7:
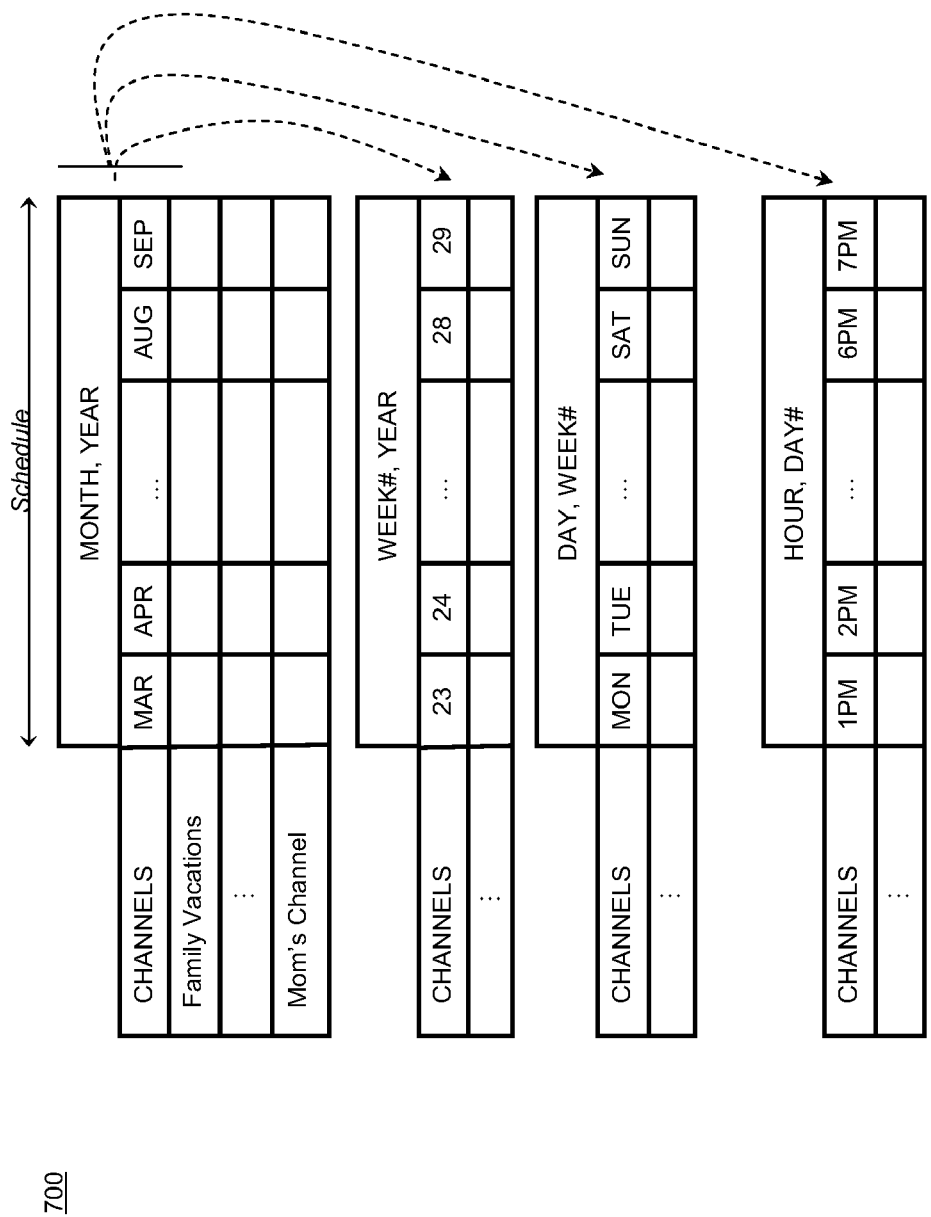
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
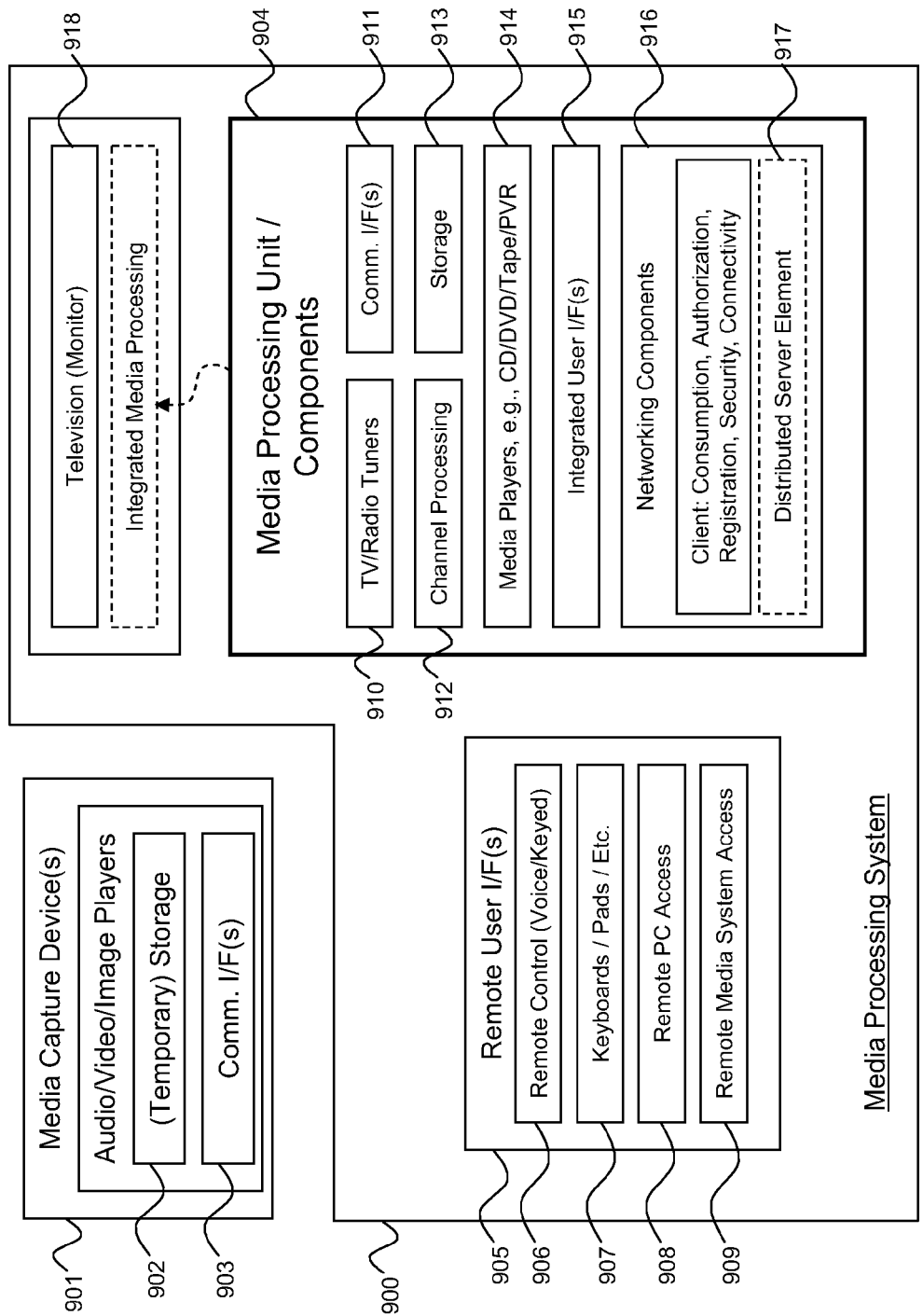
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
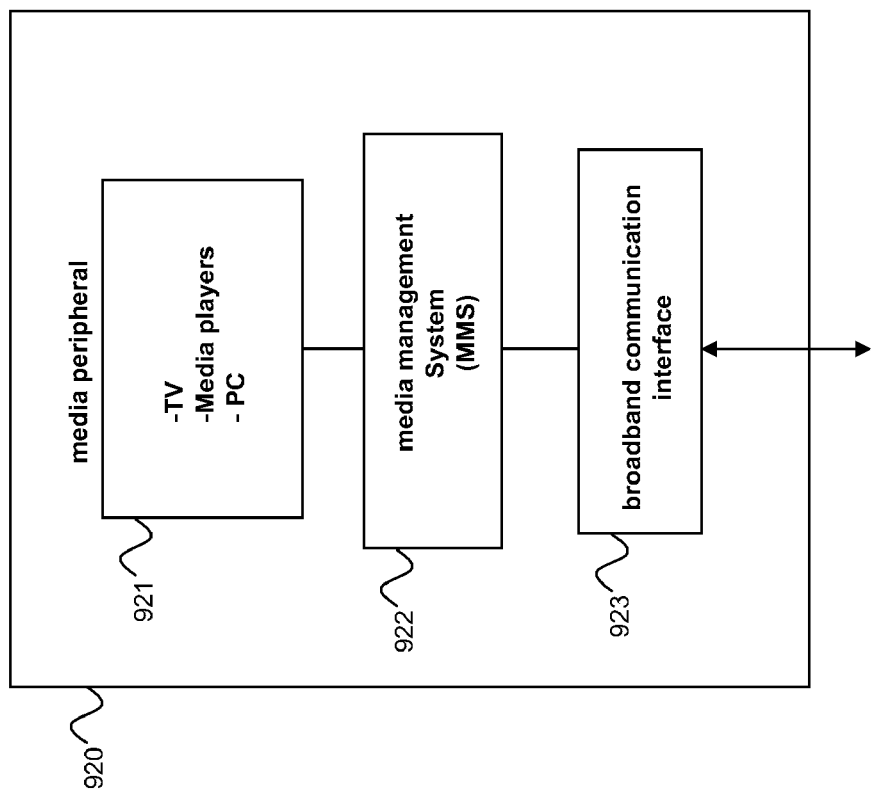
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
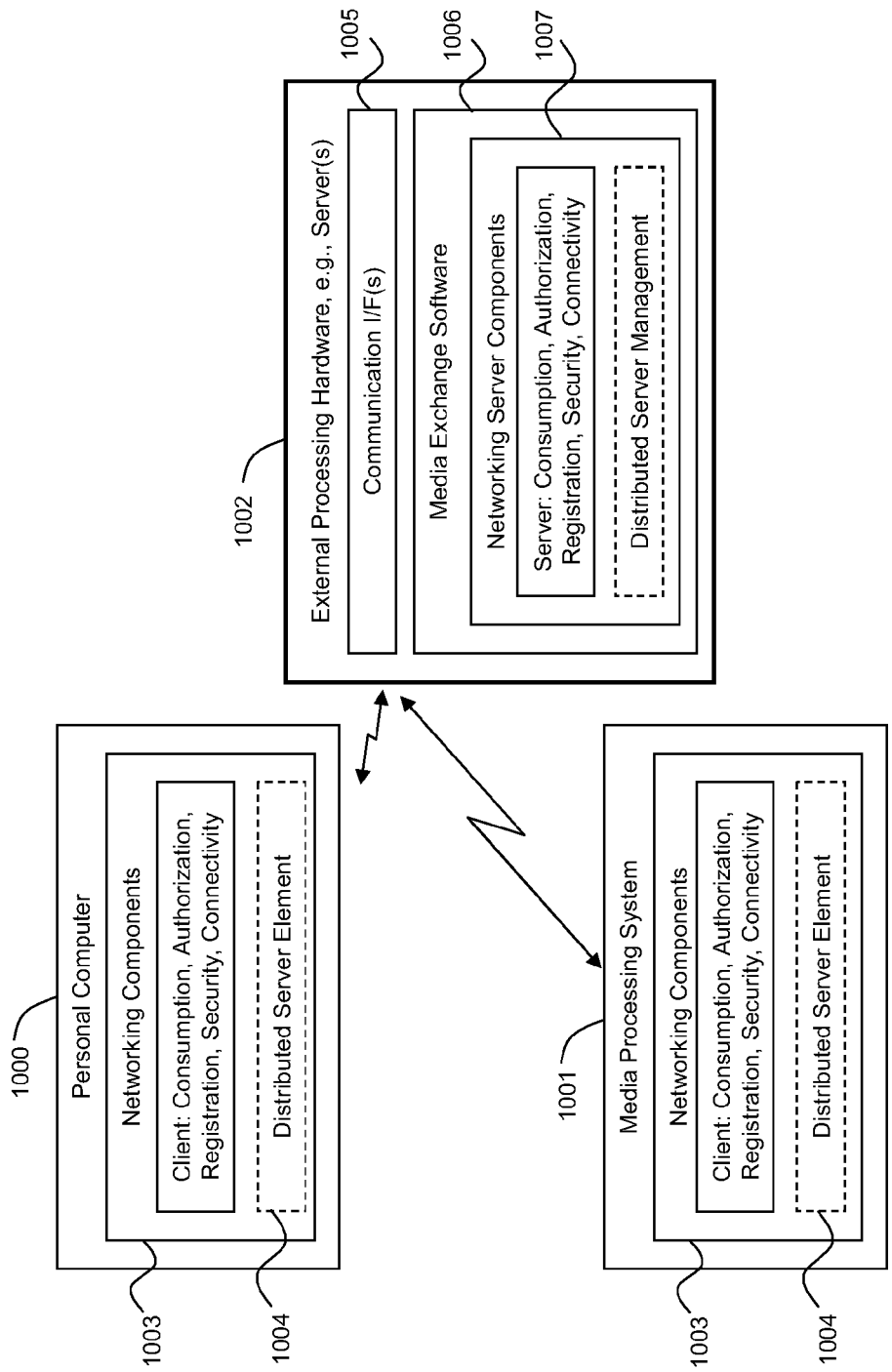
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various aspects of the present invention provide search support for exchange and consumption of media in a personal media network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system providing search functionality to support the exchange and consumption of media among a self administered group of users administered by a member of the self administered group of users, the system comprising:
   a first television in a first home;
   a first storage in the first home that stores the media; the first storage supporting consumption of the media by the first television, and having a first network protocol address associated with a first user;
   a user interface displayed on the first television in the first home, the user interface having at least one view comprising a representation of media available for consumption, the user interface supporting delivery of media from the first home to a second home;
   a second television in the second home;
   a second storage supporting consumption of the media by the second television in the second home, and having a second network protocol address associated with a second user; and
   search software that receives a request comprising user defined search criteria and one of the first and second associated network protocol addresses, the first and second associated network protocol addresses representing members of the self-administered group of users, where the self-administered group of users is defined based on authorization by the member of the self-administered group of the users, and responds by identifying media currently stored on at least one of the first and second storage, the identified media matching the user defined search criteria.

2. The system of claim 1 wherein the media comprises one or more of audio, a still image, video, and/or data.

3. The system of claim 1 wherein the first and second network protocol addresses are one of an Internet protocol (IP) address, a media access control (MAC) address, or an electronic serial number (ESN).

4. The system of claim 1 wherein the first storage and second storage communicatively couple via a communication network that comprises one or more of a cable infrastructure, a satellite network infrastructure, a digital subscriber line (DSL) infrastructure, an Internet infrastructure, an intranet infrastructure, a wired infrastructure, and/or a wireless infrastructure.

5. The system of claim 4 wherein the communication network is the Internet.

6. The system of claim 1 wherein consumption comprises one or more of playing digitized audio, displaying a still image, displaying video, and/or displaying data.

7. The system of claim 1 wherein the user defined search criteria comprises one or more of a time period, a device type, a specific media, a media type, a specific media channel, and/or a media channel type.

8. The system of claim 1 further comprising: at least one media peripheral communicatively coupled to the first storage, the at least one media peripheral having storage; and the search software responding by identifying media stored on the at least one media peripheral, the identified media matching the user defined search criteria.

9. The system of claim 8 wherein the at least one media peripheral comprises one or more of a digital camera, a digital camcorder, a television, a personal computer, a CD player, a home juke-box, a multi-media gateway device, a multi-media personal digital assistant, a DVD player, a tape player, and/or a MP3 player.

10. The system of claim 1 further comprising: at least one server for storing media, the at least one server having been designated by a user for searching; and the search software responding by identifying media stored on the at least one server, the identified media matching the user defined search criteria.

11. The system of claim 10 wherein the at least one server comprises one or more of a 3rd party media provider, a media peripheral, a personal computer, a 3rd party storage vendor, and/or a broadband head end.

12. A system providing search functionality supporting the exchange and consumption of media among a self-administered group of users administered by a member of the self-administered group of users, the system comprising:
a first storage for storing media, in a first home, and having a first protocol address associated with a first user;
a user interface displayed on a first television in the first home, the user interface having at least one view comprising a representation of media available for consumption, the user interface supporting delivery of media from the first home to a second home;
a second storage for storing media, in the second home, and having a second protocol address associated with a second user;
set top box circuitry, in the first home, communicatively coupled to support searching of storage at the first and second associated protocol addresses; and
search software that receives a request comprising user defined search criteria and one of the first and second associated protocol addresses, the first and second associated protocol addresses representing members of the self-administered group of users, where the self-administered group of users is defined based on authorization by the member of the group of users, and responds by identifying media currently available at one or both of the first and second associated protocol addresses, the identified media matching the user defined search criteria.

13. The system of claim 12 wherein the media comprises one or more of audio, a still image, video, and/or data.

14. The system of claim 12 wherein the first and second protocol addresses are one of an Internet protocol (IP) address, a media access control (MAC) address, or an electronic serial number (ESN).

15. The system of claim 12 wherein the set top box circuitry and the second storage communicatively couple via a communication network that comprises one or more of a cable infrastructure, a satellite network infrastructure, a digital subscriber line (DSL) infrastructure, an Internet infrastructure, an intranet infrastructure, a wired infrastructure, and/or a wireless infrastructure.

16. The system of claim 15 wherein the communication network is the Internet.

17. The system of claim 12 wherein consumption comprises one or more of playing digitized audio, displaying a still image, displaying video, and/or displaying data.

18. The system of claim 12 wherein the user defined search criteria comprises one or more of a time period, a device type, a specific media, a media type, a specific media channel, and/or a media channel type.

19. The system of claim 12 further comprising: at least one media peripheral communicatively coupled to the first storage, the at least one media peripheral having storage; and the search software responding by identifying media stored on the at least one media peripheral, the identified media matching the user defined search criteria.

20. The system of claim 19 wherein the at least one media peripheral comprises one or more of a digital camera, a digital camcorder, a television, a personal computer, a CD player, a home juke-box, a multi-media gateway device, a multi-media personal digital assistant, a DVD player, a tape player, and/or a MP3 player.

21. The system of claim 12 further comprising: at least one server for storing media, the at least one server having been designated by a user for searching; and the search software responding by identifying media stored on the at least one server, the identified media matching the user defined search criteria.

22. The system of claim 21 wherein the at least one server comprises one or more of a 3rd party media provider, a media peripheral, a personal computer, a 3rd party storage vendor, and/or a broadband head end.

23. A system providing search functionality supporting the exchange and consumption of media among a self-administered group of users administered by a member of the self-administered group of users, the system comprising:
a first storage for storing media at a first home of a first user, the first user being one of the self-administered group of users, where the self-administered group of users is defined based on authorization by the member of the group of users;

a user interface displayed on a first television in the first home, the user interface having at least one view comprising a representation of media available for consumption, the user interface supporting delivery of media from the first storage in the first home to a second home;

a second storage for storing media at the second home of a second user, the second user being one of the self-administered group of users;

set top box circuitry, in at least one of the first and second homes, the set top box circuitry communicatively coupled to support the identification of media currently available to the self-administered group of users; and search software that receives user defined search criteria and that responds by identifying media currently available within the self-administered group of users, the identified media matching the user defined search criteria, the search software receiving a request comprising user defined search criteria and one of first and second associated network protocol addresses, the first and second associated network protocol addresses representing members of the self-administered group of users.

24. The system of claim 23 wherein the media comprises one or more of audio, a still image, video, and/or data.

25. The system of claim 23 wherein the user defined search criteria comprises one or more of a time period, a device type, a specific media, a media type, a specific media channel, and/or a media channel type.

26. The system of claim 23 further comprising: at least one media peripheral communicatively coupled to the first storage, the at least one media peripheral having storage; and the search software responding by identifying media stored on the at least one media peripheral, the identified media matching the user defined search criteria.

27. The system of claim 26 wherein the at least one media peripheral comprises one or more of a digital camera, a digital camcorder, a television, a personal computer, a CD player, a home juke-box, a multi-media gateway device, a multi-media personal digital assistant, a DVD player, a tape player, and/or a MP3 player.

28. A system providing search functionality supporting the exchange and consumption of media among a self-administered group of users administered by a member of the self-administered group of users, the system comprising:

set top box circuitry, in at least one of first and second homes, the set top box circuitry communicatively coupled to support the identification of media currently available to members of the self-administered group of users, where the self-administered group of users is defined based on authorization by the member of the self-administered group of users;

a user interface displayed on a first television in the first home, the user interface having at least one view comprising a representation of media available for consumption, the user interface supporting delivery of media from the first home to a second home; and search software that receives user defined search criteria and that responds by identifying the media currently available within the self administered group of users, the identified media matching the user defined search criteria, the search software receiving a request comprising user defined search criteria and one of first and second associated network protocol addresses, the first and second associated network protocol addresses representing members of the self-administered group of users.

29. The system of claim 28 wherein the media comprises one or more of audio, a still image, video, and/or data.

30. The system of claim 28 wherein the user defined search criteria comprises one or more of a time period, a device type, a specific media, a media type, a specific media channel, and/or a media channel type.

31. The system of claim 28 wherein at least one media peripheral is communicatively coupled to a first storage in the first home, the at least one media peripheral having storage; and the search software responding by identifying media stored on the at least one media peripheral, the identified media matching the user defined search criteria.

32. The system of claim 31 wherein the at least one media peripheral comprises one or more of a digital camera, a digital camcorder, a television, a personal computer, a CD player, a home juke-box, a multi-media gateway device, a multi-media personal digital assistant, a DVD player, a tape player, and/or a MP3 player.

* * * * *